(12) United States Patent
Sato (10) Patent No.: US 7,061,696 B2
(45) Date of Patent: *Jun. 13, 2006

(54) SINGLE FOCUS LENS WITH PARTICULAR OPTICAL DISTORTION

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 61 days.

This patent is subject to a terminal disclaimer.

(21) Appl. No.: 10/951,635

(22) Filed: Sep. 29, 2004

(65) Prior Publication Data

US 2005/0073753 A1    Apr. 7, 2005

(30) Foreign Application Priority Data

Oct. 1, 2003    (JP) .............................. 2003-343025

(51) Int. Cl.
  *G02B 9/04*    (2006.01)
  *G02B 13/18*    (2006.01)
  *G02B 3/02*    (2006.01)
(52) U.S. Cl. ...................... 359/793; 359/794; 359/717
(58) Field of Classification Search ........ 359/793–795, 359/753, 717
See application file for complete search history.

(56) References Cited

U.S. PATENT DOCUMENTS 6,853,504 B1 *    2/2005    Jo et al. ..................... 359/793

FOREIGN PATENT DOCUMENTS

JP    2000-258684    9/2000

* cited by examiner

*Primary Examiner*—Alicia M Harrington
(74) *Attorney, Agent, or Firm*—Arnold International; Jon W. Henry; Bruce Y. Arnold (57) ABSTRACT

A single focus lens includes, in order from the object side: a diaphragm stop; and first and second lens components, each lens component being of positive refractive power and each having a convex surface on the object side near the optical axis. Each of the two lens components has two aspheric surfaces, may be a lens element, and preferably is made of plastic. The single focus lens may include no other lens elements and the diaphragm stop may be on the object side of the single focus lens. Specified on-axis conditions are satisfied in order to reduce aberrations and to make the single focus lens compact. Additionally, satisfying a condition related to the optical distortion at the maximum image height and at fifty percent of the maximum image height helps reduce the actual observed distortion of an image.

20 Claims, 6 Drawing Sheets

Lateral Color
Fig. 5D

Distortion
Fig. 5C

Astigmatism
Fig. 5B

Spherical Aberration
Fig. 5A

Fig. 7

(PRIOR ART)

SINGLE FOCUS LENS WITH PARTICULAR OPTICAL DISTORTION

BACKGROUND OF THE INVENTION

In recent years digital still cameras (hereinafter referred to simply as digital cameras) that enable input of picture image information, such as photographed landscapes and portraits, into a personal computer are rapidly becoming more popular. Additionally, portable telephones that include portable cameras that incorporate compact imaging modules with high functionality are rapidly becoming more popular. Furthermore, including an imaging module in compact information terminal equipment, such as PDAs (Personal Digital Assistants), is becoming popular.

In such devices that include an imaging function, an image pickup element, such as a CCD (Charge Coupled Device) or a CMOS (Complementary Metal Oxide Semiconductor), is used to provide the imaging function. Recently, advancements in the miniaturization of such image pickup elements have been rapidly increasing. This has resulted in a desire for the main body of such devices and the imaging lens system used in the imaging module to also be further miniaturized. Additionally, image pickup elements with a larger number of pixels in the same area have been developed in order to achieve higher image quality, which creates a demand for higher resolution lens systems that are still very compact, as well as higher contrast performance. Japanese Laid-Open Patent Application 2000-258684 describes exemplary single focus imaging lenses for such devices that include only two lens elements.

As stated above, recent image pickup elements are smaller and provide more pixels in a given detector area, which helps meet demands of higher resolution and more compactness that are especially required in imaging lenses for digital cameras. On the other hand, considerations of small cost and compactness have been the main considerations for imaging lenses for compact information terminal equipment, such as portable telephones with cameras. However, more recently, such devices have incorporated megapixel detectors (detectors that detect one million or more pixels), indicating increasing demand for higher performance in these devices as well, which has been accompanied by demands to make such devices smaller and to improve other performance properties. Therefore, development of lens systems with a wide range of applications based on properly balancing considerations of cost, performance, and compactness is desired.

For example, as an imaging lens for compact information terminal equipment having a large number of pixels, there has been developed a lens system having three lens components, each of which may be a lens element, with at least two lens elements being made of plastic, while the third lens element may be made of plastic or glass. However, in order to meet recent demands for greater miniaturization, a lens that uses a smaller number of lens components and lens elements, but which is equivalent in performance to these conventional lenses, is desired.

Although the lenses described in Japanese Laid-Open Patent Application 2000-258684, referenced above, each have a two-component, two-element lens construction, which includes aspheric surfaces, a lens system that is even more compact and higher in performance is desired. Particularly, when a small-size image pickup element is used, a lens system that well corrects lateral color is desired as the lens system because lateral color readily becomes noticeable.

Additionally, it is desirable to well correct distortion in order to achieve higher performance. In order to do this, a common type of imaging lens is frequently designed by considering optical distortion, but it is considered that an improvement in the perceived image of a photographed picture on a monitor screen can be made by considering the TV distortion related directly to the monitor in the design of the imaging lens. For example, the apparent distortion of the entire image can be made unnoticeable by balancing the TV distortion with the optical distortion.

Figure 7:
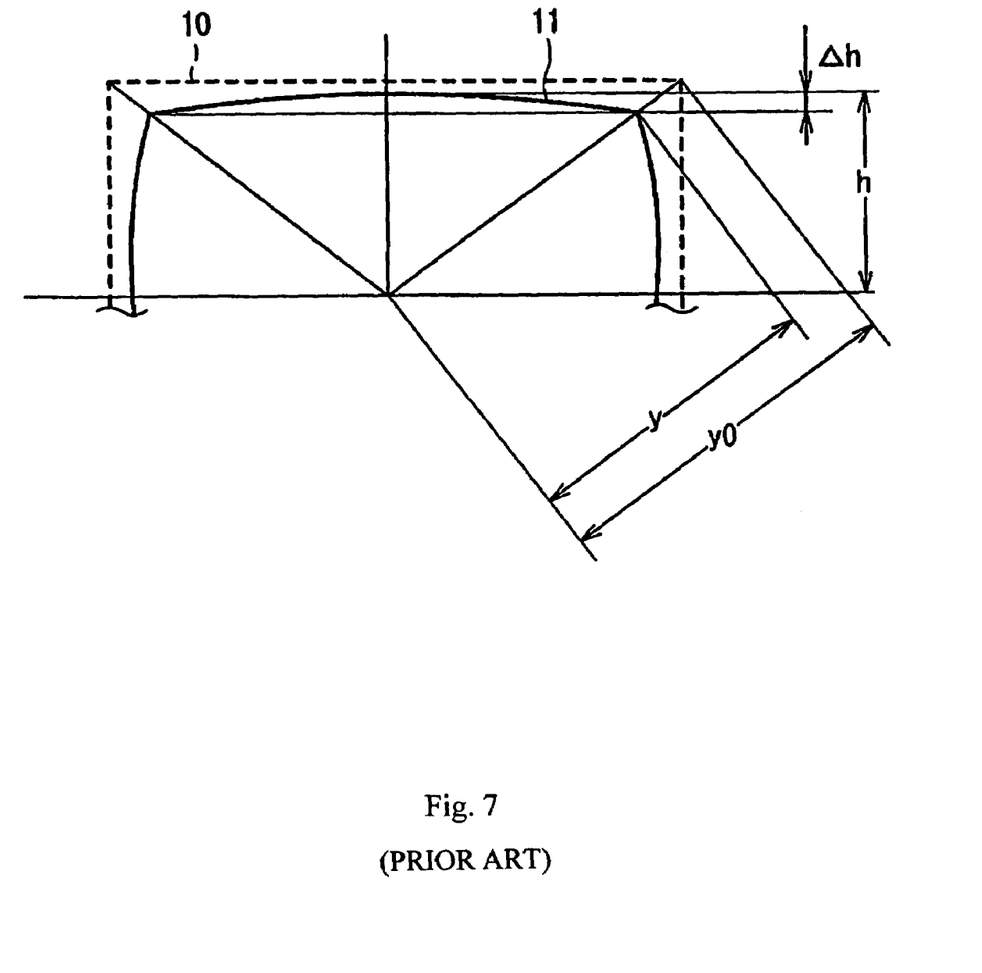
FIG. 7 shows an ideal image and an actual image with distances for determining optical distortion and TV distortion indicated.

Concepts of optical distortion and TV distortion will now be described with reference to FIG. 7. FIG. 7 schematically shows a rectangular object that is imaged via an optical system and displayed on a TV screen. In FIG. 7, a broken line 10 shows the rectangular shape that would be the ideal representation of the rectangular object, and a solid line 11 shows the shape of an actual displayed image. With reference to FIG. 7, if the ideal image height is y0 and the actual image height is y, the amount of aberration of optical distortion D is generally expressed by the following equation:

$$D=[(y-y0)/y0]\times 100 \ (\%).$$

Namely, the optical distortion D is defined by dividing the difference between the actual image height y and the ideal image height y0 by the ideal image height y0 and multiplying the quotient obtained by 100 percent in order to express the optical distortion in percentage terms.

On the other hand, again with reference to FIG. 7, the TV distortion Dt is defined by dividing the depth of curvature $\Delta h$ of the long side of the actual image that ideally would have no curvature by twice the vertical height h (i.e., as measured from the optical axis, which corresponds to the center of the TV image) of a shorter side of the actual image and multiplying the quotient obtained by 100 percent in order to express the optical distortion in percentage terms. Thus, the TV distortion is defined by the following equation:

$$Dt=(\Delta h/2h)\times 100(\%).$$

BRIEF SUMMARY OF THE INVENTION

The present invention relates to a single focus lens that can be extremely compact, uses a small number of lens components and lens elements, and can achieve high optical performance with hardly noticeable distortion of an actual image by particular use of aspheric lens surfaces. The present invention relates particularly to such a single focus lens that can be mounted in small information terminal equipment such as portable phones with a camera and in PDAs.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
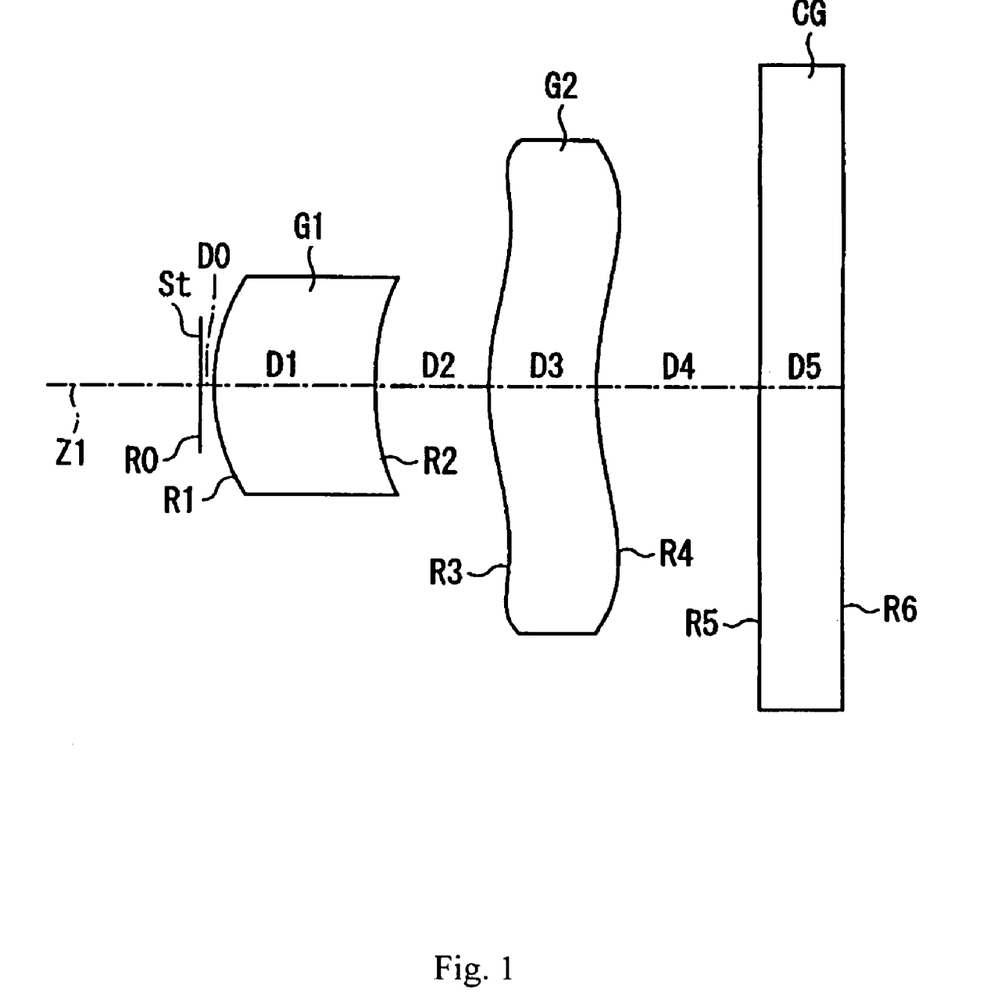
FIG. 1 shows a cross-sectional view of the single focus lens according to Embodiment 1.

A general description of the preferred embodiments of the single focus lens of the present invention will now be described with reference to FIG. 1. FIG. 1 shows a cross-sectional view of the single focus lens of Embodiment 1. In FIG. 1, the lens elements of the single focus lens are referenced by the symbols G1 and G2, in order from the object side of the single focus lens along the optical axis Z1. Additionally, a cover glass on the image side of the second lens element G2 is referenced by the symbol CG. The radii of curvature of the lens elements G1, G2, and the cover glass CG are referenced by the letter R followed by a number denoting their order from the object side of the single focus lens, from R0 to R6. The on-axis surface spacings along the optical axis Z1 between the surfaces of the optical elements are referenced by the letter D followed by a number denoting their order from the object side of the single focus lens, from D0 to D5. In FIG. 1, the image plane (not shown) is on the image side of the cover glass CG. The single focus lens further includes a diaphragm stop St on the object side of the first lens element G1. The stop St operates as an aperture stop.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the single focus lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The single focus lens of the present invention can be used, for example, in a digital camera or a portable modular camera that uses an image pickup element, such as a CCD (not shown). As shown in FIG. 1, the single focus lens includes, arranged in order from the object side along the optical axis Z1, the stop St, the first lens element G1, the second lens element G2, and the cover glass CG, with the image pickup element (not shown) being at the image plane (not shown) close to and on the image side of the cover glass CG. The cover glass CG is arranged at or adjacent the image plane so as to protect the image-detecting elements of the CCD. In addition to the cover glass CG, other optical elements such as an infrared cut-off filter and/or a low-pass filter may also be arranged between the second lens element G2 and the image plane.

The first lens element G1 is of positive refractive power, is of meniscus shape with a convex surface on its object side, and has aspheric shapes on both surfaces. The second lens element G2 is of positive refractive power near the optical axis, is of meniscus shape near the optical axis having a convex surface on its object side near the optical axis that changes to a concave surface near the periphery within the effective diameter of the object-side surface of the second lens element G2, and having a concave surface on its image side near the optical axis that changes to a convex surface near the periphery within the effective diameter of the image-side surface of the second lens element G2. Thus, both surfaces of the second lens element G2 also have aspheric shapes. The image-side surface of the second lens element G2 has a concave shape associated with negative refractive power near the optical axis Z1, the absolute value of the refractive power of the image-side surface decreases toward the periphery of the image-side surface within the effective diameter of the second lens element G2, and the image-side surface becomes convex near the periphery of the lens surface so that the second lens element G2 includes a part with negative refractive power within the effective diameter of the second lens component. That is, the second lens component G2 includes a central part near the optical axis having positive refractive power and includes a part outside the central part that has negative refractive power within the effective diameter of the object-side surface of the second lens component G2. In this manner, as shown in FIG. 1, the second lens element G2 appears to be bent from its center on the optical axis toward its periphery within its effective diameter.

The lens surfaces that are aspheric are defined using the following equation:

$$Z = [(C \cdot Y^2)/\{1 + (1 - K \cdot C^2 \cdot Y^2)^{1/2}\}] + \sum (A_i \cdot Y^i) \qquad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R, in mm) of the aspheric lens surface on the optical axis, Y is the distance (in mm) from the optical axis, K is the eccentricity, and $A_i$ is the ith aspheric coefficient, and the summation extends over i.

In the embodiments of the invention disclosed below, aspheric coefficients other than $A_3$–$A_{10}$ are zero for all lens surfaces and some of the aspheric coefficients $A_3$–$A_{10}$ are zero for some of the lens surfaces.

The shape of each aspheric lens surface on the optical axis is expressed by the portion of Equation (A) that relates to the eccentricity K and not by the polynomial part that relates to the aspheric coefficient $A_i$.

The single focus lens is constructed so that it satisfies the following Conditions (1)–(3):

$0.20 < R1/f < 0.70$                       Condition (1)

$0.05 < D2/f1 < 0.3$                      Condition (2)

$0.3 < |(pa-pb)/pa| < 1.3$                Condition (3)

where
- R1 is the radius of curvature on the optical axis Z1 of the object-side surface of the first lens element G1,
- f is the focal length of the entire single focus lens on the optical axis Z1,
- D2 is the distance on the optical axis Z1 from the image-side lens surface of the first lens element G1 to the object-side lens surface of the second lens element G2,
- f1 is the focal length of the first lens element G1 on the optical axis Z1,
- pa is the optical distortion at the maximum image height, and
- pb is the optical distortion at fifty percent of the maximum image height.

If Condition (1) is not satisfied, it becomes especially difficult to correct coma aberration and lateral color aberration. If Condition (2) is not satisfied, it becomes difficult to obtain a proper distance to the exit pupil of the single focus lens while reducing the total length of the single focus lens.

Additionally, by placing the stop St on the object side of the single focus lens, by having a first lens element G1 and a second lens element G2 in order from the object side with no intervening lens element, each of which has aspheric shapes on both surfaces, and by making the shapes and the distribution of refractive power among the lens elements appropriate by satisfying Conditions (1) and (2) above, the shapes and distribution of refractive powers among the lens surfaces and lens elements can be optimized.

Furthermore, by satisfying Condition (3), an actual image of hardly noticeable distortion can be achieved by balancing the TV distortion with optical distortion introduced by the single focus lens. If Condition (3) is not satisfied, an imbalance occurs, resulting in noticeable distortion of the actual image observed.

Additionally, preferably the single focus lens satisfies the following Condition (4):

$0.70 < \Delta ZF/\Delta ZR < 1.20$               Condition (4)

where
- $\Delta ZF$ is the object-side shape displacement at the maximum height at which an image forming light ray passes through the object-side surface of the first lens element G1, and
- $\Delta ZR$ is the image-side shape displacement at the maximum height at which an image forming light ray passes through the image-side surface of the first lens element G1.

Figure 3:
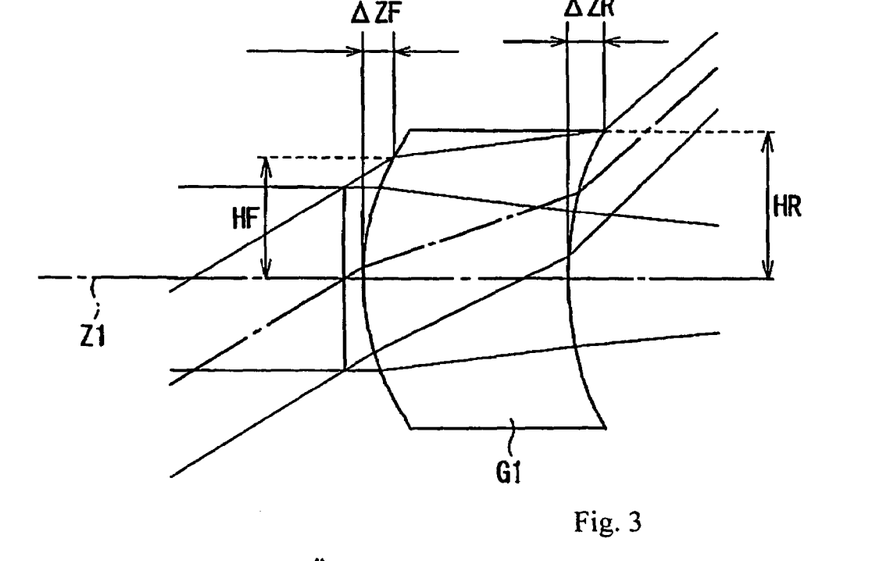
FIG. 3 shows a cross-sectional view of a first lens element according to the present invention with various heights and shape displacements indicated.

The term "shape displacement" is herein defined as follows with reference to FIG. 3 that shows a cross-sectional view of the first lens element G1 with various heights and shape displacements indicated. As shown in FIG. 3, shape displacement is defined as the distance in the direction of the optical axis from a plane perpendicular to the optical axis that passes through the vertex of the lens element on the optical axis (i.e., a plane passing through the object-side vertex for an "object-side shape displacement" and a plane passing through the image-side vertex for an "image-side shape displacement") to the object-side surface of the lens element for an object-side shape displacement and to the image-side surface of the lens element for an image-side shape displacement. The maximum height at which an image forming light ray passes through the object-side surface of the first lens element G1 is designated as the dimension HF in FIG. 3; the maximum height at which an image forming light ray passes through the image-side surface of the first lens element G1 is designated as the dimension HR in FIG. 3; and, as shown in FIG. 3, these heights are measured perpendicular to the optical axis Z1.

If Condition (4) is not satisfied, it becomes difficult to correct lateral color and it becomes more difficult to satisfactorily manufacture the second lens element G2. Additionally, higher performance can generally be achieved by satisfying Condition (4).

Additionally, preferably the single focus lens satisfies the following Condition (5):

$0.85 < db/da < 1.10$                    Condition (5)

where
- da is the thickness along the optical axis of the second lens component, and
- db is the distance along the optical axis between the plane perpendicular to the optical axis that passes through the point of the intersection of the imaging light ray of maximum height at the object-side surface of the second lens component and the plane perpendicular to the optical axis that passes through the point of the intersection of this imaging light ray at the image-side surface of the second lens component.

Figure 4:
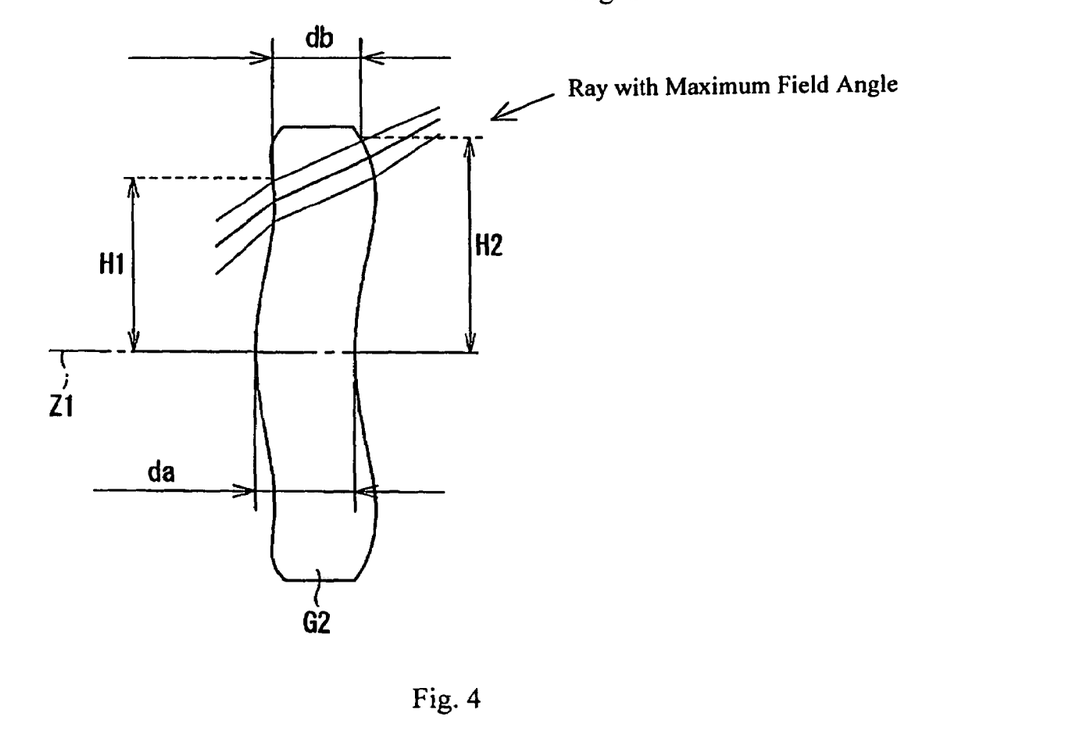
FIG. 4 shows a cross-sectional view of a second lens element according to the present invention with various distances in the direction of the optical axis indicated.

FIG. 4 shows db and da at the second lens component of the single focus lens as defined in terms of height H1 of the imaging light ray of maximum height at the object-side surface of the second lens component and the height H2 of the imaging light ray of maximum height at the image-side surface of the second lens component. Those heights H1 and H2 represent the effective aperture of the single focus lens at the object-side surface and the image-side surface, respectively, of the second lens component of the single focus lens.

If Condition (5) is not satisfied, correction of distortion becomes difficult. Additionally, higher performance can generally be achieved by satisfying Condition (5).

By satisfying Conditions (1)–(5) above, a high performance single focus lens that effectively uses aspheric surfaces and is equivalent to a conventional three component, three element single focus lens but is extremely compact can be realized.

Because both surfaces of each of the first lens element G1 and the second lens element G2 are aspheric, it is preferable that the lens elements be made of plastic for ease of manufacture of the lens elements.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f on the optical axis of the entire single focus lens, the f-number $F_{NO}$, and the maximum field angle $2\omega$.

TABLE 1

| # | R | D | $N_d$ | $v_d$ |
|---|---|---|---|---|
| 0 (stop) | ∞ | 0.10 | | |
| 1* | 1.4638 | 1.18 | 1.50614 | 56.4 |
| 2* | 2.3464 | 0.82 | | |
| 3* | 2.0905 | 0.77 | 1.50614 | 56.4 |
| 4* | 2.7466 | 1.18 | | |
| 5 | ∞ | 0.60 | 1.51680 | 64.2 |
| 6 | ∞ | | | |
| | f = 3.94 mm | $F_{NO}$ = 4.0 | $2\omega$ = 60.7° | |

The surfaces with a * to the right of the surface number in Table 1 are aspheric lens surfaces, and the aspheric surface shapes are expressed by Equation (A) above.

Table 2 below lists the values of the constant K and the aspheric coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $10\times10^{-2}$.

TABLE 2

| # | K | $A_3$ | $A_4$ | $A_5$ | $A_6$ |
|---|---|---|---|---|---|
| 1 | -4.0691 | 0 | 2.0632E-1 | 0 | -9.1075E-2 |
| 2 | -9.6249 | 0 | 8.9875E-2 | 0 | 1.0112E-1 |
| 3 | -4.6459 | -6.3908E-3 | -1.5026E-2 | -3.9510E-2 | 3.0353E-3 |
| 4 | -8.8133 | 4.0300E-2 | 2.2635E-2 | -1.1799E-1 | 3.5354E-2 |

| | $A_7$ | $A_8$ | $A_9$ | $A_{10}$ |
|---|---|---|---|---|
| 1 | 0 | -6.0637E-3 | 0 | 5.5267E-3 |
| 2 | 0 | -4.1842E-2 | 0 | 1.1947E-2 |
| 3 | 4.4656E-3 | 5.6359E-4 | -2.1899E-3 | 1.8562E-3 |
| 4 | 2.6899E-2 | -1.2120E-2 | -5.0708E-3 | 2.4476E-3 |

The single focus lens of Embodiment 1 satisfies Conditions (1)–(5) above, as set forth in Table 3 below.

TABLE 3

| Condition No. | Condition | Value |
|---|---|---|
| (1) | 0.20 < R1/f < 0.70 | 0.372 |
| (2) | 0.05 < D2/f1 < 0.3 | 0.155 |
| (3) | 0.3 < |(pa − pb)/pa| < 1.3 | 0.66 |
| (4) | 0.70 < $\Delta$ZF/$\Delta$ZR < 1.20 | 0.90 |
| (5) | 0.85 < db/da < 1.10 | 0.90 |

Figure 5A:
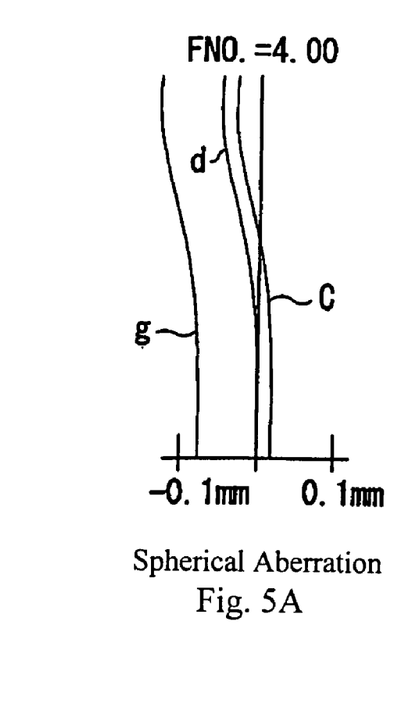
FIGS. 5A–5D show the spherical aberration, astigmatism, distortion, and lateral color, respectively, of the single focus lens according to Embodiment 1.
Figure 5B:
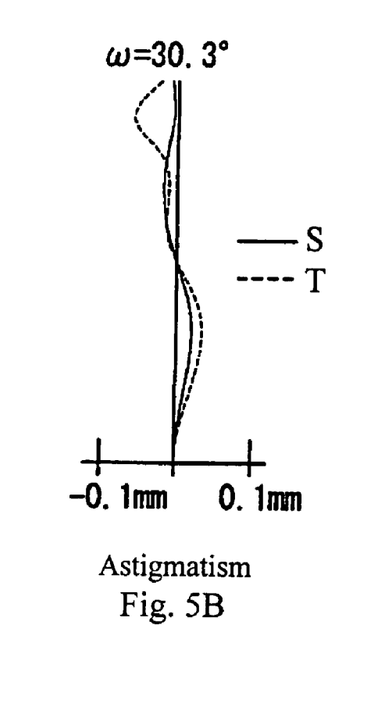
Figure 5C:
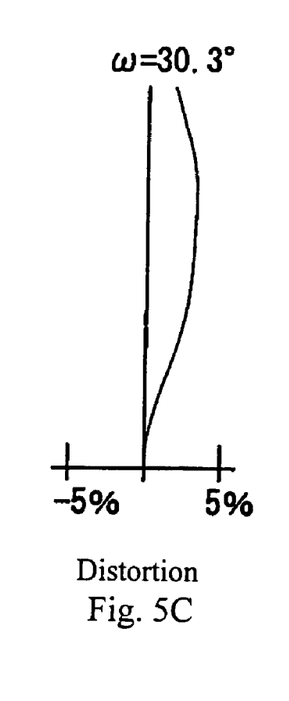
Figure 5D:
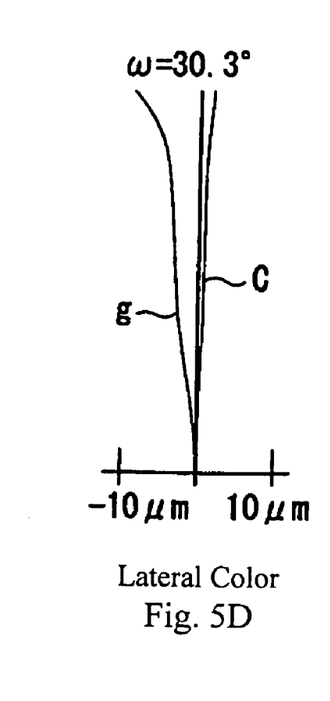

FIGS. 5A–5D show the spherical aberration, astigmatism, distortion, and lateral color, respectively, of the single focus lens according to Embodiment 1. In FIG. 5A, the spherical aberration is shown for the d-line ($\lambda$=587.6 nm), the g-line ($\lambda$=435.8 nm), and the C-line ($\lambda$=656.3 nm). As shown in FIG. 5A, the f-number is 4.00. In FIG. 5B, the astigmatism is shown at the d-line ($\lambda$=587.6 nm) for both the sagittal image surface S and the tangential image surface T. In FIG. 5C, the distortion is shown at the d-line ($\lambda$=587.6 nm). The half-field angle $\omega$ for FIGS. 5B–5D is 30.3°. FIG. 5D shows the lateral color at the g-line ($\lambda$=435.8 nm) and the C-line ($\lambda$=656.3 nm) relative to the d-line ($\lambda$=587.6 nm).

As is clear from the lens data and aberration curves discussed above, in Embodiment 1 the various aberrations are favorably corrected, and performance capabilities that are suitable for a compact single focus lens can be obtained.

Embodiment 2

Figure 2:
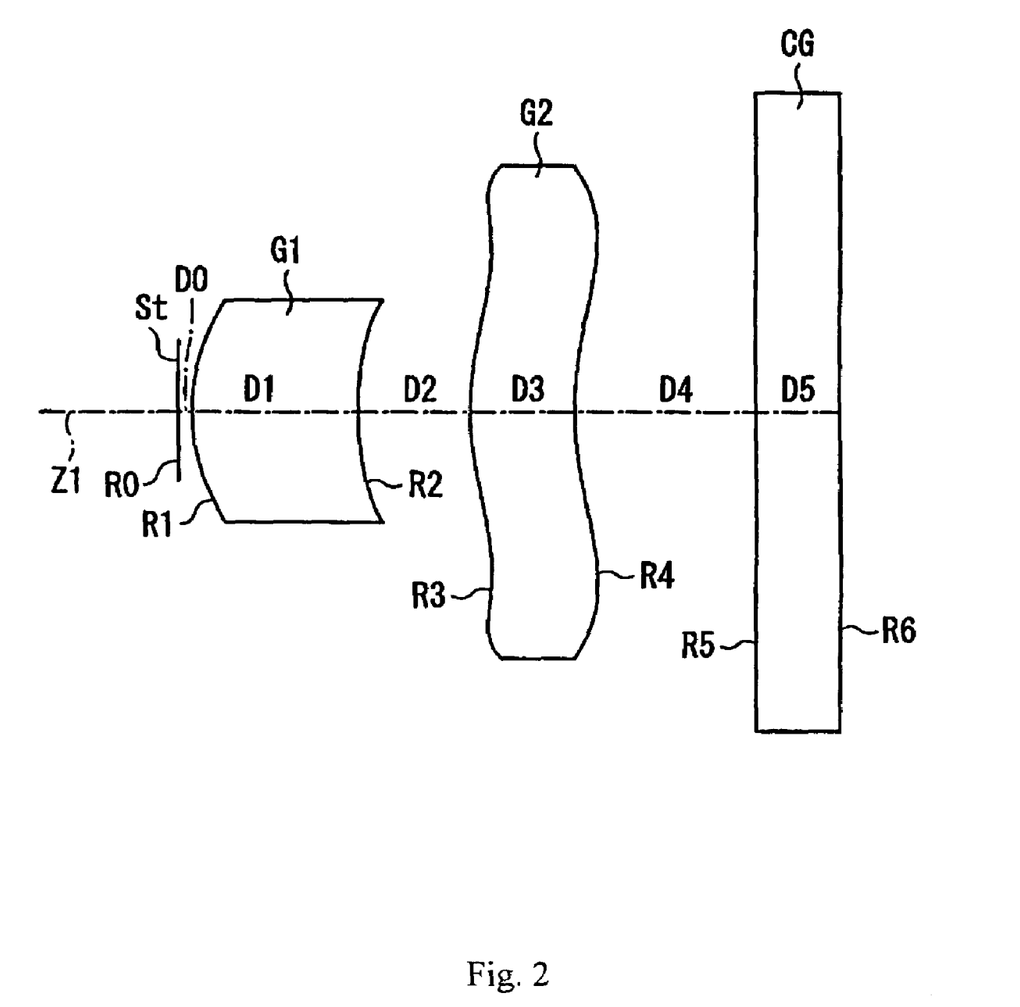
FIG. 2 shows a cross-sectional view of the single focus lens according to Embodiment 2.

FIG. 2 shows Embodiment 2 of the present invention. Table 4 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2. Listed in the bottom portion of Table 4 are the focal length f on the optical axis of the entire single focus lens, the f-number $F_{NO}$, and the maximum field angle $2\omega$.

TABLE 4

| # | R | D | $N_d$ | $v_d$ |
|---|---|---|---|---|
| 0 (stop) | ∞ | 0.10 | | |
| 1* | 1.4586 | 1.20 | 1.49023 | 57.5 |
| 2* | 2.3480 | 0.81 | | |
| 3* | 2.0914 | 0.76 | 1.49023 | 57.5 |
| 4* | 2.7489 | 1.30 | | |
| 5 | ∞ | 0.60 | 1.51680 | 64.2 |
| 6 | ∞ | | | |
| | f = 4.08 mm | $F_{NO}$ = 4.0 | $2\omega$ = 58.9° | |

The surfaces with a * to the right of the surface number in Table 4 are aspheric lens surfaces, and the aspheric surface shapes are expressed by Equation (A) above.

Table 5 below lists the values of the constant K and the aspheric coefficients $A_3$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0\times10^{-2}$.

TABLE 5

| # | K | $A_3$ | $A_4$ | $A_5$ | $A_6$ |
|---|---|---|---|---|---|
| 1 | -4.0691 | 0 | 3.4526E-6 | 0 | 2.0632E-1 |
| 2 | -9.6253 | 0 | -2.0968E-5 | 0 | 8.9873E-2 |
| 3 | -4.6459 | -6.3881E-3 | -1.5025E-2 | -3.9507E-2 | 3.0357E-3 |
| 4 | -8.8133 | 4.0299E-2 | 2.2634E-2 | -1.1799E-1 | 3.5353E-2 |

| | $A_7$ | $A_8$ | $A_9$ | $A_{10}$ |
|---|---|---|---|---|
| 1 | 0 | 1.4710E-7 | 0 | -9.1075E-2 |
| 2 | 0 | -1.2720E-6 | 0 | 1.0112E-1 |
| 3 | 4.4661E-3 | 5.6364E-4 | -2.1898E-3 | 1.8562E-3 |
| 4 | 2.6899E-2 | -1.2120E-2 | -5.0710E-3 | 2.4476E-3 |

The single focus lens of Embodiment 2 satisfies Conditions (1)–(5) above, as set forth in Table 6 below.

TABLE 6

| Condition No. | Condition | Value |
|---|---|---|
| (1) | 0.20 < R1/f < 0.70 | 0.358 |
| (2) | 0.05 < D2/f1 < 0.3 | 0.149 |
| (3) | 0.3 < |(pa − pb)/pa| < 1.3 | 0.53 |
| (4) | 0.70 < $\Delta$ZF/$\Delta$ZR < 1.20 | 0.90 |
| (5) | 0.85 < db/da < 1.10 | 0.92 |

Figure 6A:
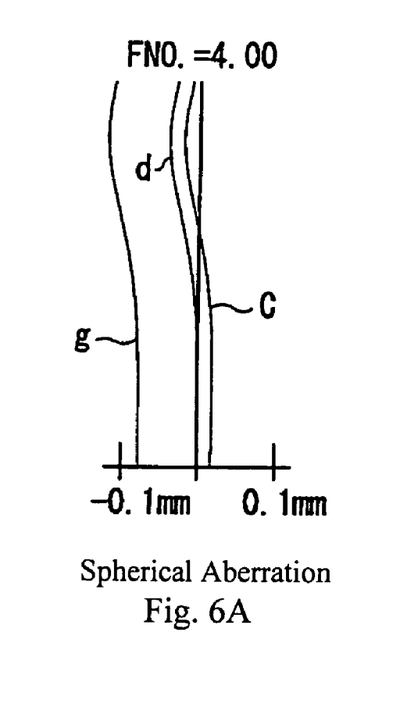
FIGS. 6A–6D show the spherical aberration, astigmatism, distortion, and lateral color, respectively, of the single focus lens according to Embodiment 2.
Figure 6B:
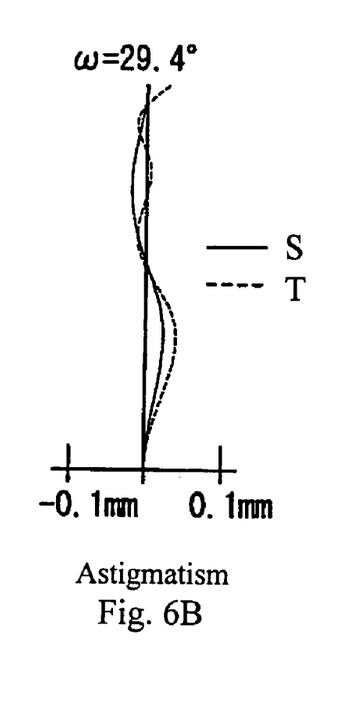
Figure 6C:
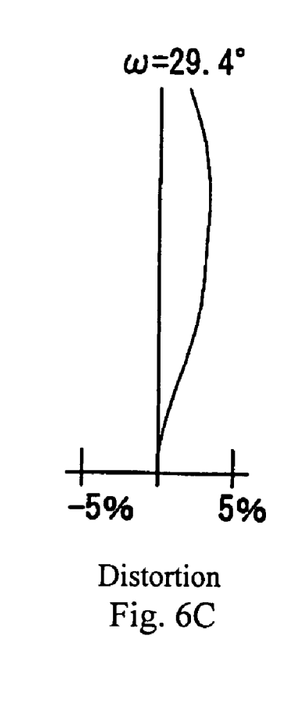
Figure 6D:
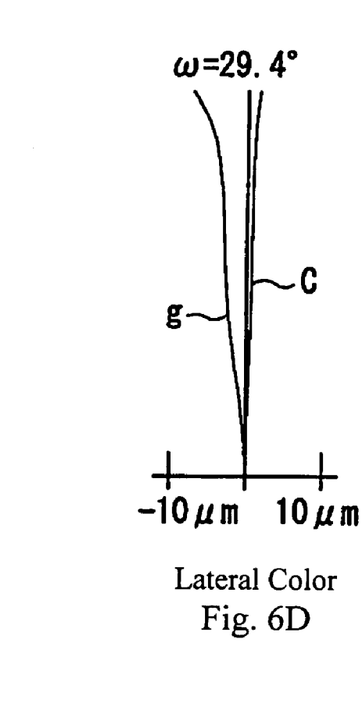

FIGS. 6A–6D show the spherical aberration, astigmatism, distortion, and lateral color, respectively, of the single focus lens according to Embodiment 2. In FIG. 6A, the spherical aberration is shown for the d-line (λ=587.6 nm), the g-line (λ=435.8 nm), and the C-line (λ=656.3 nm). As shown in FIG. 6A, the f-number is 4.00. In FIG. 6B, the astigmatism is shown at the d-line (λ=587.6 nm) for both the sagittal image surface S and the tangential image surface T. In FIG. 6C, the distortion is shown at the d-line (λ=587.6 nm). The half-field angle ω for FIGS. 6B–6D is 29.4°. FIG. 6D shows the lateral color at the g-line (λ=435.8 nm) and the C-line (λ=656.3 nm) relative to the d-line (λ=587.6 nm).

As is clear from the lens data and aberration curves discussed above, in Embodiment 2 the various aberrations are favorably corrected, and performance capabilities that are suitable for a compact single focus lens can be obtained.

The invention being thus described, it will be obvious that the same may be varied in many ways. For instance, values such as the radius of curvature R of each of the lens elements, the surface spacing D, the refractive index $N_d$, as well as the Abbe number $\nu_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens comprising, arranged along an optical axis in order from the object side:
   a stop on the object side of the single focus lens;
   a first lens component of positive refractive power, having a meniscus shape, having both surfaces of aspheric shape, and having a convex object-side surface;
   a second lens component of positive refractive power near the optical axis, having a meniscus shape near the optical axis, having both surfaces of aspheric shape, having a convex object-side surface near the optical axis, and having a part of negative refractive power within the effective diameter of the object-side surface of the second lens component;
   wherein
   the following conditions are satisfied:

$0.20<R1/f<0.70$ $0.05<D2/f1<0.3$ $0.3<|(pa-pb)/pa|<1.3$ where
   R1 is the radius of curvature on the optical axis of the object-side surface of the first lens component,
   f is the focal length of the entire single focus lens on the optical axis,
   D2 is the distance on the optical axis from the image-side lens surface of the first lens component to the object-side lens surface of the second lens component,
   f1 is the focal length of the first lens component on the optical axis,
   pa is the optical distortion at the maximum image height, and
   pb is the optical distortion at fifty percent of the maximum image height.

2. The single focus lens of claim 1, wherein the first lens component is a lens element.

3. The single focus lens of claim 2, wherein the second lens component is a lens element.

4. The single focus lens of claim 3, wherein each of the first lens component and the second lens component is made of plastic.

5. The single focus lens of claim 1, wherein the stop, the first lens component, and the second lens component are arranged in that order along the optical axis from the object side without any intervening lens element.

6. The single focus lens of claim 5, wherein each of the first and second lens components consists of a lens element.

7. The single focus lens of claim 1, wherein the single focus lens is formed of only two lens components.

8. The single focus lens of claim 7, wherein the first lens component is a lens element.

9. The single focus lens of claim 8, wherein the second lens component is a lens element.

10. The single focus lens of claim 1, wherein each of the first lens component and the second lens component is made of plastic.

11. The single focus lens of claim 1, wherein the following conditions are satisfied:

$0.70<\Delta ZF/\Delta ZR<1.20$ $0.85<db/da<1.10$ where
    $\Delta ZF$ is the object-side shape displacement at the maximum height at which an image forming light ray passes through the object-side surface of the first lens component,
    $\Delta ZR$ is the image-side shape displacement at the maximum height at which an image forming light ray passes through the image-side surface of the first lens component,
    da is the thickness along the optical axis of the second lens component, and
    db is the distance along the optical axis between the plane perpendicular to the optical axis that passes through the point of the intersection of the imaging light ray of maximum height at the object-side surface of the second lens component and the plane perpendicular to the optical axis that passes through the point of the intersection of this imaging light ray at the image-side surface of the second lens component.

12. The single focus lens of claim 11, wherein the first lens component is a lens element.

13. The single focus lens of claim 12, wherein the second lens component is a lens element.

14. The single focus lens of claim 13, wherein each of the first lens component and the second lens component is made of plastic.

15. The single focus lens of claim 11, wherein the stop, the first lens component, and the second lens component are arranged in that order along the optical axis from the object side without any intervening lens element.

16. The single focus lens of claim 15, wherein each of the first and second lens components consists of a lens element.

17. The single focus lens of claim 11, wherein the single focus lens is formed of only two lens components.

18. The single focus lens of claim 17, wherein the first lens component is a lens element.

19. The single focus lens of claim 18, wherein the second lens component is a lens element.

20. The single focus lens of claim 19, wherein each of the first and second lens components is made of plastic.

* * * * *